3,137,663
POLYSTYRENE- AND POLYSTYRENE-POLY-METHYLMETHACRYLATE BLOCK POLYMERS

Michel E. Mullier, Takoma Park, Md., assignor to W. R. Grace & Co., Clarksville, Md., a corporation of Connecticut
No Drawing. Filed Oct. 9, 1959, Ser. No. 845,337
2 Claims. (Cl. 260—45.5)

This invention is directed to the preparation of a polystyrene-polymethylmethacrylate block polymer by polymerizing styrene in the presence of an organic hydroperoxide and ions of a multivalent metal, followed by treating the thus-formed polystyrene with methylmethacrylate monomer, whereby a polystyrene-polymethylmethacrylate block polymer is formed. This block polymer has the general formula:

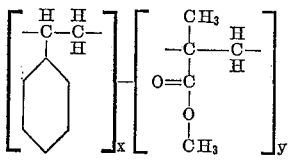

in which $x$ has a value corresponding to an intrinsic viscosity of about 0.30 to 0.40, and $(x+y)$ a value corresponding to an intrinsic viscosity of about 1.30 to 1.60. Which is to say, the polystyrene base has an intrinsic viscosity of 0.30 to 0.40, and after the methylmethacrylate monomer has been polymerized thereon, the final block polymer product has an intrinsic viscosity of about 1.3 to 1.6. The absolute values of $x$ and $y$, representing the number of styrene and methylmethacrylate molecules respectively in the polymer molecule, have not been established with certainty.

The aforesaid process of polymerizing styrene to provide the polystyrene intermediate is per se a separate part of the instant invention.

Polystyrene-polymethylmethacrylate block polymers are well-known products. See J. Polymer Science, 17, 51–64 (1955); ibid., 26, 236–239 (1957); ibid., 27, 580–581 (1958). The block polymers prepared by the process of this invention are thermoplastic and have properties and uses substantially the same as known polystyrene-polymethylmethacrylate and comparable contents of polystyrene and polymethylmethacrylate blocks.

The intrinsic viscosity (limiting viscosity, in benzene at 25° C.) of the block polymers prepared by the process of this invention is about 1.32 to 1.55; the polystyrene:polymethylmethacrylate ratio is about 1:4.

EXAMPLE I

*Preparation of Polystyrene Base by Bulk Polymerization*

A solution consisting of 20 ml. styrene, 0.370 g. tert-butylhydroperoxide, and 0.023 g. cupric octanoate was heated at 60° C. under a nitrogen atmosphere for 15¼ hours, at the end of which time the resultant styrene polymer was isolated by precipitation in petroleum ether; the polyer was purified by dissolution in benzene, followed by a new precipitation in methanol. The polymer was washed with methanol and dried in vacuo at room temperature. The yield was 3.7 g., or 20.4%.

EXAMPLE II

*Preparation of Polystyrene Base by Solution Polymerization in Benzene*

A solution of 20 ml. styrene, 20 ml. benzene, 0.604 g. tert-butylhydroperoxide and 0.02 g. cupric octanoate was heated in sealed tube and under nitrogen atmosphere at 60° C. for 1,440 minutes, at the end of which time the resultant styrene polymer was recovered as in Example I. The yield was 3.9 g. or 21.7%. The intrinsic viscosity in benzene soluton at 25° C., using a dilution-Ostwald modified viscosimeter, was 0.30.

EXAMPLE III

*Preparation of Polystyrene Base by Solution Polymerization (in Dioxane)*

A solution of 20 ml. styrene, 10 ml. dioxane, 0.140 g. tert-butylhydroperoxide and 0.5 g. cupric octanoate was heated in sealed tube and under nitrogen atmosphere at 60° C. for 375 minutes, at the end of which time the resultant styrene polymer was recovered by precipitation in petroleum ether. The polymer was purified by dissolution in benzene followed by precipitation in methanol; after washing the polystyrene with methanol, it was dried in vacuo at room temperature. The yield was 8.40%. The intrinsic viscosity in benzene solution at 25° C., using a dilution-Ostwald modified viscosimeter, was 0.37.

EXAMPLE IV

*Preparation of Polystyrene Base by Solution Polymerization (in Dioxane)*

A solution of 20 ml. styrene, 10 ml. dioxane, 0.140 g. tert-butylhydroperoxide and 0.5 cupric octanoate was heated in a sealed tube and under nitrogen atmosphere at 60° C. for 1,185 minutes, at the end of which time the resultant styrene polymer was recovered as in the preceding example. The yield was 26.24%. The intrinsic viscosity was 0.41.

EXAMPLE V

*Block Polymerization of Methylmethacrylate on Bulk Polystyrene Base*

A solution of 2.0 g. of the styrene polymer of Example I, 4 ml. methylmethacrylate, and 6 ml. benzene (solvent) was heated at 100° C. for 19 hours, at the end of which time the resultant solid polystyrene-polymethylmethacrylate copolymer was isolated and purified as above. The yield of polymerized methylmethacrylate was 5.28 g., or 87.2%. This includes the methylmethacrylate in the block polymer as well as methylmethacrylate homopolymer.

EXAMPLE VI

*Block Polymerization of Methylmethacrylate on Polystyrene Base*

A solution of 1.0 g. of the styrene polymer of Example II, 2 ml. methylmethacrylate and 3 ml. benzene (solvent) was heated at 100° C. for 1,110 minutes, at the end of which time the resultant styrene polymer was recovered as in the two preceding examples. The yield of polymerized methylmethacrylate was 91.8%. This includes the methylmethacrylate in the block polymer as well as methylmethacrylate homopolymer.

EXAMPLE VII

*Block Polymerization of Methylmethacrylate on Polystyrene Base*

A solution of 1.0 g. of the styrene polymer of Example III, 2 ml. methylmethacrylate and 3 ml. benzene (solvent) was heated at 100° C. for 1,035 minutes, at the end of which time the resultant polystyrene-polymethylmethacrylate block-polymer, polystyrene homopolymer and polymethylmethacrylate were recovered by precipitation in petroleum ether. The polymers were purified by dissolution in benzene followed by precipitation in methanol; after washing the polymers with methanol, they were dried in vacuo at 40° C. The yield of polymerized methylmethacrylate was 78.2%. This includes the methylmethacrylate in the block polymer as well as methylmethacrylate homopolymer.

EXAMPLE VIII

*Block Polymerizaton of Methylmethacrylate on Polystyrene Base*

A solution of 1.0 g. of the styrene polymer of Example IV, 2 ml. methylmethacrylate and 3 ml. benzene (solvent) was heated at 100° C. for 1,035 minutes, at the end of which time the resultant polymers were recovered and purified as above. The yield of polymerized methylmethacrylate was 89.2%. This includes the methylmethacrylate in the block polymer as well as methylmethacrylate homopolymer.

*Purification and Isolation*

The crude polymer resulting from the second polymerization step (reaction of methylmethacrylate monomer with polystyrene) is a homogeneous mixture of the desired polystyrene-polymethylmethacrylate block polymer product with polystyrene homopolymer and polymethylmethacrylate homopolymer. The block polymer is generally about 20–35% of the total polymer mixture, and may be suitably recovered therefrom by fractionation (see J. Polymer Sci. 8, 289 [1952]) as follows:

EXAMPLE IX 2 g. of the product of Example V was dissolved in 100 ml. chloroform at 25° C. 150 ml. of methanol was added, whereby substantially all polystyrene homopolymer was precipitated. This polystyrene was removed by centrifugation, leaving a solution of block polymer and polymethylmethacrylate homopolymer. An additional 107 ml. of methanol was then added, whereupon substantially all of the polystyrene-polymethylmethacrylate block polymer precipitated. It was separated from the methanol-chloroform solution by decantation, solubilized in benzene and precipitated by methanol, washed with 10 ml. portions of methanol, and then dried overnight at 40° C. in vacuo. The product weighed 0.70 g., equivalent to a content of 35% based on the weight of the total solid polymer. This block polymer had a methyl methacrylate content of 78.4% (as determined by infra-red measurements) and an intrinsic viscosity of 1.50. In this way, the crude polymers obtained in Example VIII and VII gave respectively 20% of block polymer (81.5% methylmethacrylate, intrinsic viscosity 1.55) and 23% of block polymer (83% methylmethacrylate, intrinsic viscosity 1.32).

The chloroform-methanol precipitation technique above described can be modified, if desired, to provide block polymers of variable polystyrene/polymethylmethacrylate content. For example, after substantially all the polystyrene homopolymer is precipitated (at a

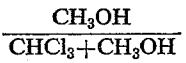

value of about 0.5), the next addition of methanol will precipitate a block polymer fraction in which the percent of polystyrene segments is fairly high. Additional precipitations will give additional fractions with increasing proportions of polymethylmethacrylate segments, until finally at a

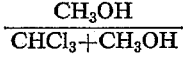

value of about 0.76, nearly all of the block polymer has been precipitated and further additions of methanol will precipitate mixtures of polymethylmethacrylate with negligible amounts of block polymer.

The reactions involved in the process of this invention are possibly as follows:

(1) The cupric octanoate ionizes to provide cupric ions and octanoate ions, thus:

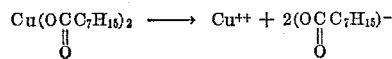

(2) The cupric ions catalyze the decomposition of tert-butylhydroperoxide to $(C_4H_9-O-O°)$ and $(C_4H_9-O°)$ radicals, thus:

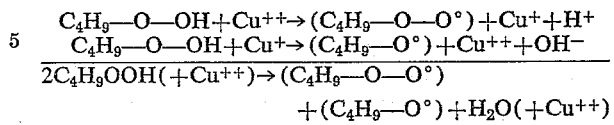

(3) Each $C_4H_9-O-O°$ and $C_4H_9-O°$ radical is able to initiate the polymerization of styrene.

As the termination reaction in the case of styrene, is an addition process, a maximum of 75% of the polystyrene molecules possess a peroxy group as the end of the chain:

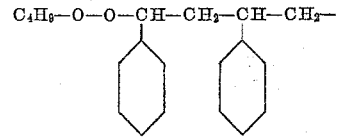

(4) The aforesaid tert-butylperoxy polystyrene acts as an initiator in the polymerization of methylmethacrylate monomer, with simultaneous decomposition of the tert-butylperoxy radical, so that a block polymer is formed comprising essentially a polystyrene macromolecule joined to a polymethylmethacrylate macromolecule.

As already stated, the above examples disclose preferred embodiments of the invention, which embodiments are directed specifically to tert-butylhydroperoxide and cupric octanoate. Actually these two materials are merely typical of the general redox system in which a hydroperoxide, $R-O-OH$, is decomposed in the presence of a metallic ion capable of at least two valence states, i.e., $Me^n$ and $Me^{n-1}$, to form the peroxy radical, $R-O-O°$. This redox system is well known; cf. W. Kern et al., Angewandte Chemie, 67, 573–581 (1955), and Kharasch et al., J. Org. Chem., 18, 322 (1953).

Thus, the hydroperoxides that are operable include:

(1) Saturated aliphatic hydroperoxides, e.g., isopropyl-hydroperoxide.

(2) 2-cyclohexen-1-yl hydroperoxide.

(3) Aralkyl hydroperoxides, e.g., cumene hydroperoxide.

(4) Hydroperoxides of heterocyclic compounds, e.g., tetrahydro-2-furyl-hydroperoxide.

And the suitable metallic salts include:

(1) *Anion.*—All the organic or inorganic acids giving a good solubilization of the salt in the organic medium, e.g., in benzene, copper naphthenate, copper octanoate, and copper stearate; in dioxane, ferric acetate, ceric butyrate, copper laurate, and copper stearate.

(2) *Cations.*—All the cations able to undergo the redox reaction; for instance $Cu^{++}$, $Fe^{+++}$, $Ce^{++++}$, $Co^{+++}$, $Pb^{++++}$.

The amounts of hydroperoxide and metal salt cocatalyst are not critical. In general 500 to 0.1 moles of hydroperoxide can be used per mole of metal salt. A preferred range is about 100–1 moles of hydroperoxide per mole of metal salt.

The amount of hydroperoxide is likewise not critical. A suitable operable range is 0.5 to 0.005 mole of hydroperoxide per liter.

Likewise, the ratio of polystyrene to methylmethacrylate is variable over a wide range. A suitable working range is 0.1 to 1 mole of polystyrene per mole of methylmethacrylate monomer. (One mole of styrene is considered to be the same as one mole of polystyrene in making these calculations.)

As shown in the examples, the styrene polymerization step can take place in a solvent. Suitable solvents (in addition to the benzene and dioxane already mentioned) include: toluene, chloroform, carbon tetrachloride, dimethylformamide, and the like.

The second polymerization step, in which the block polymer is formed, is preferably carried out in an inert solvent. In addition to benzene the following are suitable:

Toluene
Dioxane
Carbon tetrachloride
Chloroform
Dimethylformamide

Reaction conditions in general are not critical. The initial polymerization of styrene can be conducted at substantially any temperature that is customary for the polymerization of styrene. A range of 40 to 100° C. is typical and suitable. Similarly, for the second step (in which the block polymer is is formed) the temperature is suitably that at which methylmethacrylate is ordinarily polymerized. A range of 40 to 120° C. is suitable.

I claim:

1. The method of preparing a product comprising a polystyrene-polymethylmethacrylate block polymer that includes the steps of heating a solution of styrene containing tert-butylhydroperoxide and copper octanoate to form a homopolymeric styrene base; recovering the said base; heating it with a solution of methylmethacrylate to form a mixed product comprising essentially polystyrene-polymethylmethacrylate block polymer, polystyrene homopolymer, and polymethylmethacrylate homopolymer; and recovering polystyrene - polymethylmethacrylate block polymer from said mixture.

2. The method comprising the steps: (1) heating styrene containing minor amounts of tert-butylhydroperoxide and cupric octanoate at about 60° C. for about 15 hours to form a polystyrene; (2) heating said polystyrene with a benzene solution of methylmethacrylate at 100° C. for 19 hours to form a composition comprising essentially polystyrene-polymethylmethacrylate block polymer, unreacted polystyrene homopolymer, and polymethylmethacrylate homopolymer; (3) recovering said composition; (4) dissolving said composition in chloroform; (5) adding methanol until the volume ratio $$\frac{\text{methanol}}{\text{chloroform}+\text{methanol}}$$

is 0.5, whereby nearly all polystyrene homopolymer is precipitated; (6) removing the thus precipitated polystyrene; (7) adding additional methanol to provide a volume ratio of $$\frac{\text{methanol}}{\text{chloroform}+\text{methanol}}$$

of 0.76, whereby nearly all the polystyrene-polymethylmethacrylate block polymer is precipitated; and (8) recovering the thus precipitated block polymer.

References Cited in the file of this patent

UNITED STATES PATENTS

| | | |
|---|---|---|
| 2,787,604 | Miller | Apr. 2, 1957 |
| 2,837,496 | Vandenberg | June 3, 1958 |

OTHER REFERENCES

Lewis et al.: Am. Chem. Soc., 66, pages 1594–1601 (1944).

Orr et al.: Am. Chem. Soc., 79, pages 3137–3141 (1957).

Schildknecht: Vinyl and Related Polymers, page 14, Wiley & Sons, New York (1952).